US012724755B1

(12) United States Patent
Majerowicz

(10) Patent No.: US 12,724,755 B1
(45) Date of Patent: Sep. 1, 2026

(54) SYSTEM, METHOD, AND COMPUTER PROGRAM FOR IN-MEMORY DATA DEDUPLICATION

(71) Applicant: Amdocs Development Limited, Limassol (CY)

(72) Inventor: Lucas Dario Majerowicz, Herzlyia (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 18/811,623

(22) Filed: Aug. 21, 2024

(51) Int. Cl.
*G06F 16/215* (2019.01)
*G06F 16/23* (2019.01)
*G06F 16/2455* (2019.01)

(52) U.S. Cl.
CPC ........ *G06F 16/215* (2019.01); *G06F 16/2379* (2019.01); *G06F 16/24562* (2019.01)

(58) Field of Classification Search
CPC ...... G06F 16/215; G06F 16/23; G06F 16/245; G06F 16/2379; G06F 16/24562
See application file for complete search history.

(56) References Cited

U.S. PATENT DOCUMENTS 8,645,334 B2 * 2/2014 Leppard .............. G06F 11/2094 707/692
10,645,158 B1 * 5/2020 Ippatapu ............... G06F 3/0683
2016/0188668 A1 * 6/2016 Sharangpani ....... G06F 16/1744 707/718
2017/0123711 A1 * 5/2017 Kathpal ................ G06F 3/0608
2022/0156231 A1 * 5/2022 Wang .................. G06F 16/9027
2022/0269431 A1 * 8/2022 Ren ....................... G06F 3/0604
2023/0133361 A1 * 5/2023 Shilane ............... G06F 16/2246 707/664
2024/0005017 A1 * 1/2024 Mathew ................. G06F 21/64

OTHER PUBLICATIONS

"Java .intern()" by Codecademy Apr. 15, 2023 (Year: 2023).*

* cited by examiner

*Primary Examiner* — Maher N Algibhah
(74) *Attorney, Agent, or Firm* — Zilka-Kotab, P.C.

(57) ABSTRACT

As described herein, a system, method, and computer program are provided for deduplicating data in memory. A map of key and value pairs for each unique data item of a plurality of unique data items in a dataset is maintained. A duplicate of a unique data item of the plurality of unique data items is detected. The duplicate of the unique data item is replaced with a reference to one of the key and value pairs included in the map for the unique data item.

13 Claims, 5 Drawing Sheets

SYSTEM, METHOD, AND COMPUTER PROGRAM FOR IN-MEMORY DATA DEDUPLICATION

FIELD OF THE INVENTION

The present invention relates to managing duplicate data stored in memory.

BACKGROUND

There are many scenarios where data may be duplicated in memory. For example, for data records that store information about users, data common to multiple users may be separately stored in the data records for all of those users. Such duplicate data increases the memory resources utilized.

There is thus a need for addressing these and/or other issues associated with the prior art. For example, there is a need deduplicating data in memory. While there is always a benefit to reducing memory usage, doing so is particularly useful with regards to cache memory. For example, deduplicating data may either allow for more data to be cached with a same amount of memory used prior to the deduplication or for the amount of memory required for caching to be reduced. Furthermore, deduplicating data may also reduce the compute resources required when loading the data.

SUMMARY

As described herein, a system, method, and computer program are provided for deduplicating data in memory. A map of key and value pairs for each unique data item of a plurality of unique data items in a dataset is maintained. A duplicate of a unique data item of the plurality of unique data items is detected. The duplicate of the unique data item is replaced with a reference to one of the key and value pairs included in the map for the unique data item.

DETAILED DESCRIPTION

Figure 1:
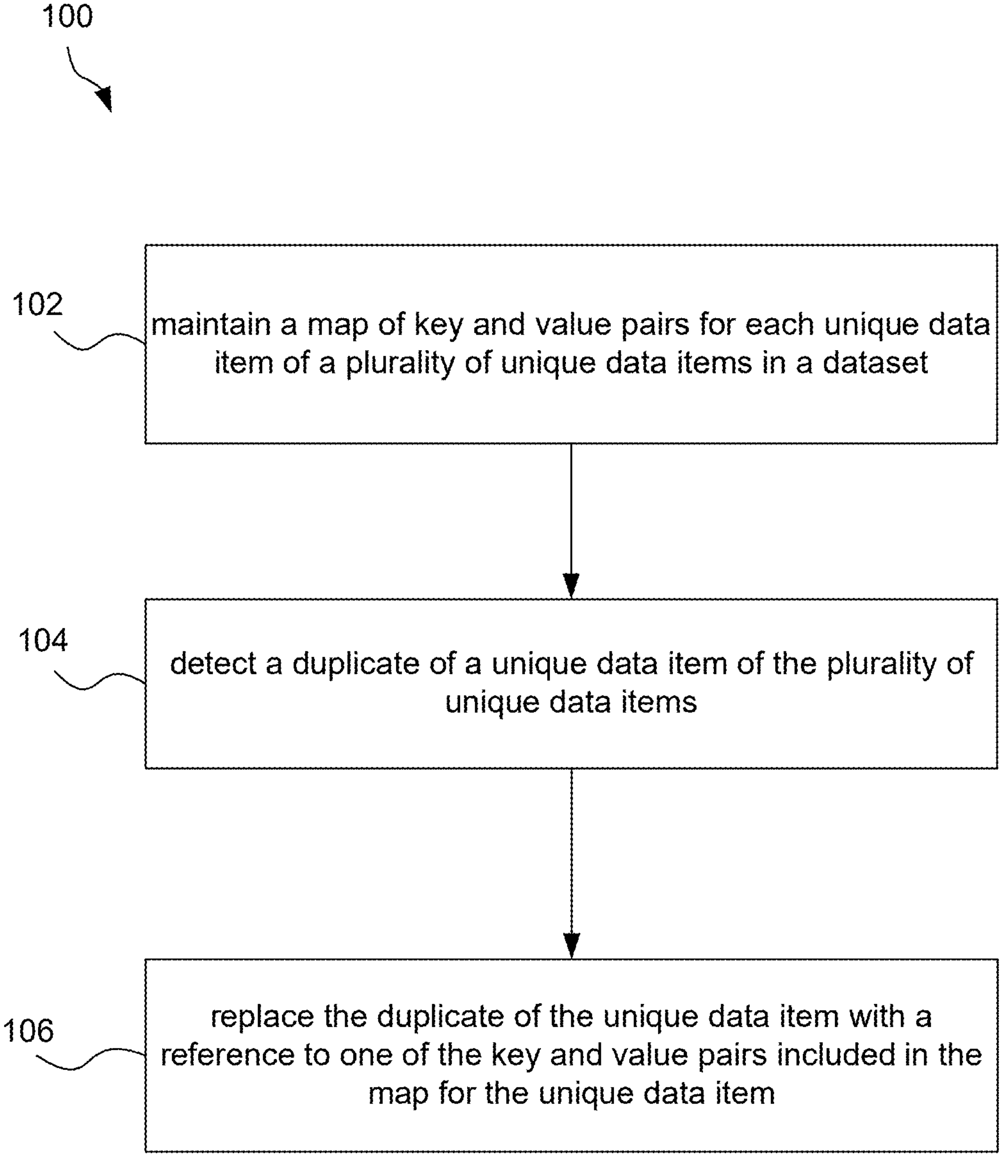
FIG. 1 illustrates a method for avoiding duplicate data items in memory, in accordance with one embodiment.

FIG. 1 illustrates a method 100 for avoiding duplicate data items in memory, in accordance with one embodiment. The method may be carried out by a computer system, such as that described below with respect to FIGS. 4 and/or 5.

In operation 102, a map of key and value pairs for each unique data item of a plurality of unique data items in a dataset is maintained. The dataset refers to any collection of data that is stored in a memory. The memory may be a primary memory, a secondary memory, a cache memory, or any other computer memory storing the dataset.

In an embodiment, the dataset may include a plurality of records in a database. In an embodiment, each of the records may store one or more data items. In any case, the dataset includes a plurality of data items, which may be strings, values, complex objects, or items of any other data type.

The unique data items in the dataset refer to each instance of a one-of-a-kind data item in the dataset. As mentioned, a map of a key and value pair for each of such unique data items in the dataset is maintained. On other words, a mapping of key and value pairs for each unique data item in the dataset is stored.

In an embodiment, the key and value for each of the key and value pairs may be the same. For example, for each of the key and value pairs, the key and the value included in the pair may match. In an embodiment, both the key and the value in the pair may be (i.e. may match) the unique data item for which the key and value pair mapping is maintained.

In an embodiment, the map of key and value pairs may be generated for an existing dataset. In this case, the map of key and value pairs may be generated by scanning the dataset and generating a key and value pair for each unique data item encountered in the dataset. In another embodiment, the map of key and value pairs may be generated as the dataset is generated. In this case, a new key and value pair mapping may be generated for each new unique data item added to the dataset.

In operation 104, a duplicate of a unique data item of the plurality of unique data items is detected. In an embodiment, the duplicate refers to a data item already included in the dataset or to be added to the dataset that matches one of the unique data items for which a key and value pair mapping is maintained. For example, the duplicate may be detected responsive to a write request (e.g. the dataset) that includes the unique data item of the plurality of unique data items. As another example, the duplicate may be detected responsive to scanning the dataset.

In operation 106, the duplicate of the unique data item is replaced with a reference to one of the key and value pairs included in the map for the unique data item. Thus, instead of storing the duplicate data item in the dataset, a reference to the key and value pair of a unique data item matching the duplicate data item may be stored. When the duplicate data item is included in a record, the reference to the key and value pair may replace the duplicate data item in the record.

In an embodiment, when a new unique data item in the dataset is detected, a new key and value pair for the new unique data item may be stored in the map. The new unique data item may be detected in a write request or during scanning of the dataset. To this end, the method 100 may operate to avoid duplicate data items in the dataset by referencing the map of key and value pairs. Avoiding duplicate data items will reduce the memory resources required to store the dataset as well computer resources required to load or otherwise process the dataset.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
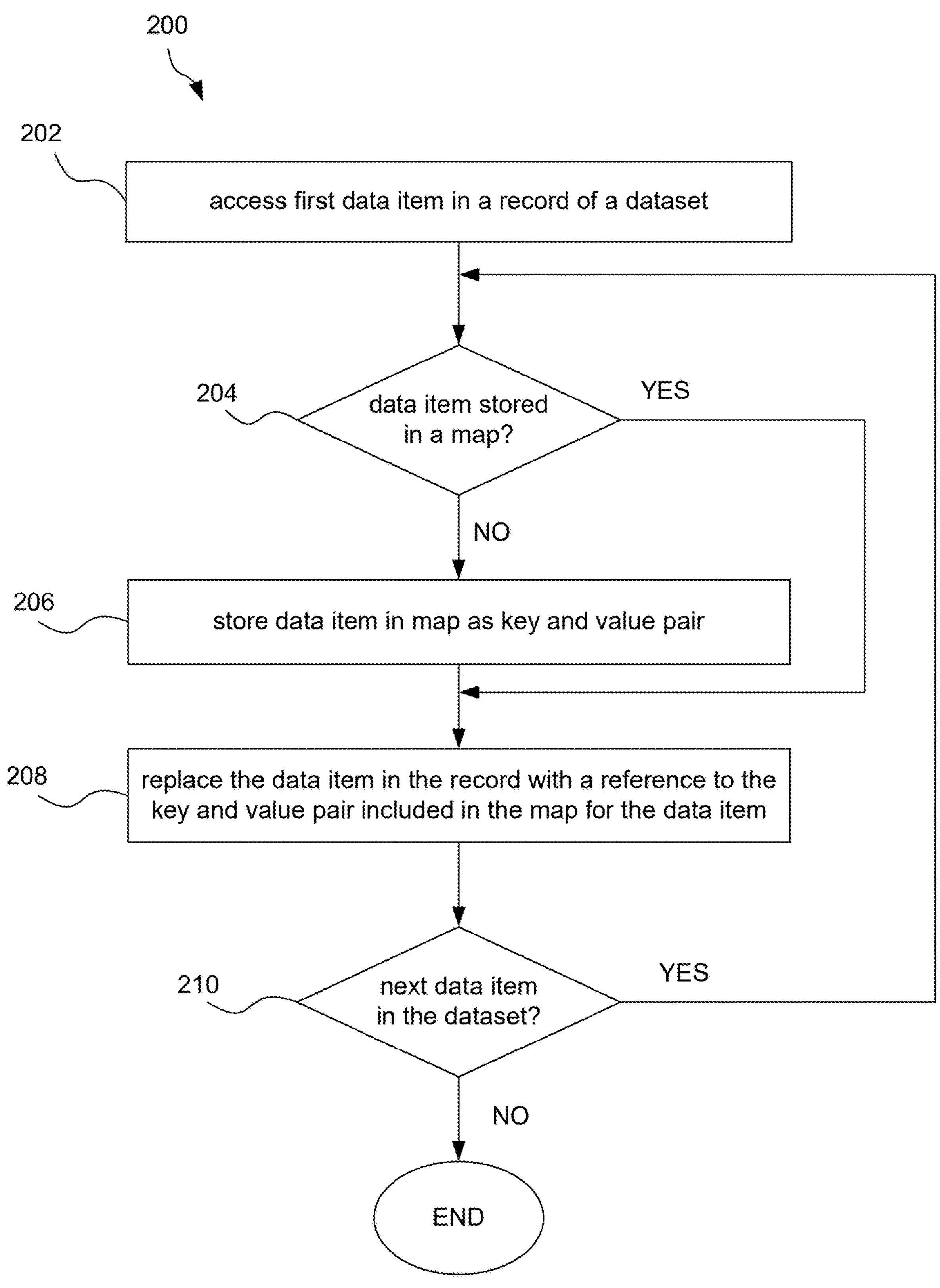
FIG. 2 illustrates a method for generating a map of key and value pairs for unique data items in a dataset, in accordance with one embodiment.

FIG. 2 illustrates a method 200 for generating a map of key and value pairs for unique data items in a dataset, in accordance with one embodiment. As an option, the method 200 may be carried out in the context of the details of the previous figure and/or any subsequent figure(s). For example, the method 200 may be carried out to generate the map of key and value pairs maintained in operation 102 of FIG. 1. Of course, however, the method 200 may be carried out in the context of any desired environment. Further, the aforementioned definitions may equally apply to the description below.

In operation 202, a first data item in a record of a dataset is accessed. The dataset in the present embodiment refers to an existing dataset of records. Each of the records includes one or more data items. The first data item may be accessed during a scan of the dataset.

In decision 204, it is determined whether the data item is stored in a map of key and value pairs. This determination may be made by comparing the data item to each key or to each value in the key and value pairs included in the map. A match may indicate that the data item is already stored in the map.

Responsive to determining in decision 204 that the data item is not already stored in the map (i.e. it is a unique data item), the data item is stored in the map as a key and value pair (see operation 206). Responsive to determining in decision 204 that the data item is already stored in the map (i.e. it is a duplicate data item) or following the addition of the key and value pair for the data item in operation 206, the data item in the record is replaced with a reference to the key and value pair included in the map for the data item.

In decision 210, it is determined whether there is a next data item in the dataset. Responsive to determining in decision 210 that there is a next data item in the dataset (whether in the same record accessed in operation 202 or in another record), then the method 200 returns to decision 204 to determine whether the data item is stored in the map of key and value pairs. To this end, the method 200 may iterate through every data item in the dataset to generate a map if key and value pairs for all unique data items in the dataset and to replace every data item in the dataset with a reference to a matching key and value pair in the map.

Figure 3:
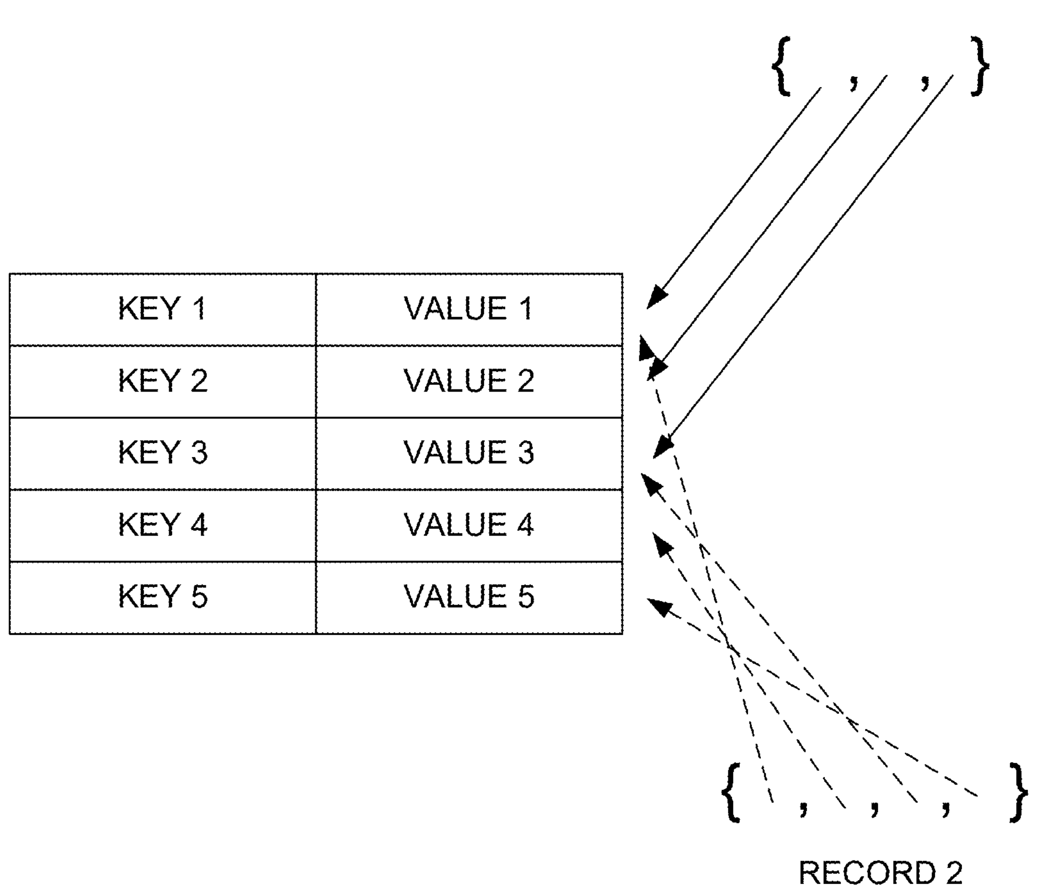
FIG. 3 illustrates a conceptual example of preventing duplicate data items in memory, in accordance with one embodiment.

FIG. 3 illustrates a conceptual example of preventing duplicate data items in memory, in accordance with one embodiment.

The embodiments disclosed herein reduce memory consumption by identifying and replacing duplicated data across different records.

Take for example the following data model (stored in a database) illustrated in Table 1.

TABLE 1

```
User: {
...,
"interests": ["programming", "java", "software"]
}
```

The interests field contains a list of topics a user is interested in. When user records are loaded by a service, each record will have its own copy of every element in its interests list. Table 2 illustrates an example of the records.

TABLE 2

```
User1.interests = ["programming", "java", "software"]
User2.interests = ["programming", "python", "software", "ui"]
```

In the example in Table 2, both "programming" and "software" will be stored twice in memory, once per user. In total, 7 string instances (3+4) would be stored.

Since "programming" and "software" appear in both interests list, it is desired to have a single copy of each (regardless of the number of records in which they appear), which reduce the number of strings kept in memory to 5. Deduplicating data is particularly useful for example when caching records (e.g. for users). This allows to either cache more data with the same amount of memory, or reduce the amount of memory required for caching to be effective. It's also useful when having to load a large number of records, and memory consumption is a concern.

In the present example shown in FIG. 3, a map called unique_contents is maintained (e.g. stored). Key and Value for each key/value pair will be the same. Table 3 illustrates an exemplary key/value pair entry in the map.

TABLE 3

```
unique_contents["programming"] = "programming"
unique_contents["java"] = "java"
unique_contents["software"] = "software"
unique_contents["python"] = "python"
unique_contents["ui"] = "ui"
```

Note that type of key/value in the map could be anything (i.e. not just strings, but could be even complex objects).

Whenever duplicate (e.g. recurring) data items are found across multiple records, those data items will be replaced with the references already stored in the map. If the data item does not already appear in the map, then a key/value pair for that data item will be added to the map. Table 4 illustrates exemplary deduplication logic for a data item.

TABLE 4

```
if (not unique_contents.contains[value]) then
   unique_contents[value] = value
end-if
value = unique_contents[value]
```

It is ensured that every loaded data item first appears in the map. Then for any new copy of that data item that been created will be replaced with a reference to the data item in the map.

In an embodiment, the unique_contents map can grow indefinitely. In an embodiment, a size limit to the map may be implemented, for example, allowing the map to contain up to 100,000 key/value pairs. That way, only the first 100,000 distinct data items to have been loaded will be deduplicated. Other possible options could be to reset the map every so often, or even implement cache-like data purging mechanisms (e.g. least recently used, etc.).

The present embodiments may be implemented for a repository service, where each commit in the repository service is associated with a set of changes/edits and has a parent commit, and where commits are stored in a document database with each commit document containing a commit sequence field which contains all the ancestor commits for that commit (in reverse order).

Table 5 illustrates an example of commit documents.

TABLE 5

```
{
"id": "10",
"commits": ["10","9","8","7","6","5","4","3","2","1"]
}
{
"id": "9",
"commits": ["9","8","7","6","5","4","3","2","1"]
```

TABLE 5-continued

```
}
{
"id": "8",
"commits": ["8","7","6","5","4","3","2","1"]
}
```

In the example shown in Table 5, it is expected that the same commit id will appear in multiple commit sequences across different commits. For example, commit “1” appears in commit sequences for commits “10”, “9” and “8” (not shown in the example, but it would also appear in the sequences for commits from “2” to “7”).

The embodiments for deduplication described herein will allow a very large number of commits to be kept in memory with a minimum memory footprint. This is even more so for commit sequences that are very large (e.g. having thousands of commit ids).

Figure 4:
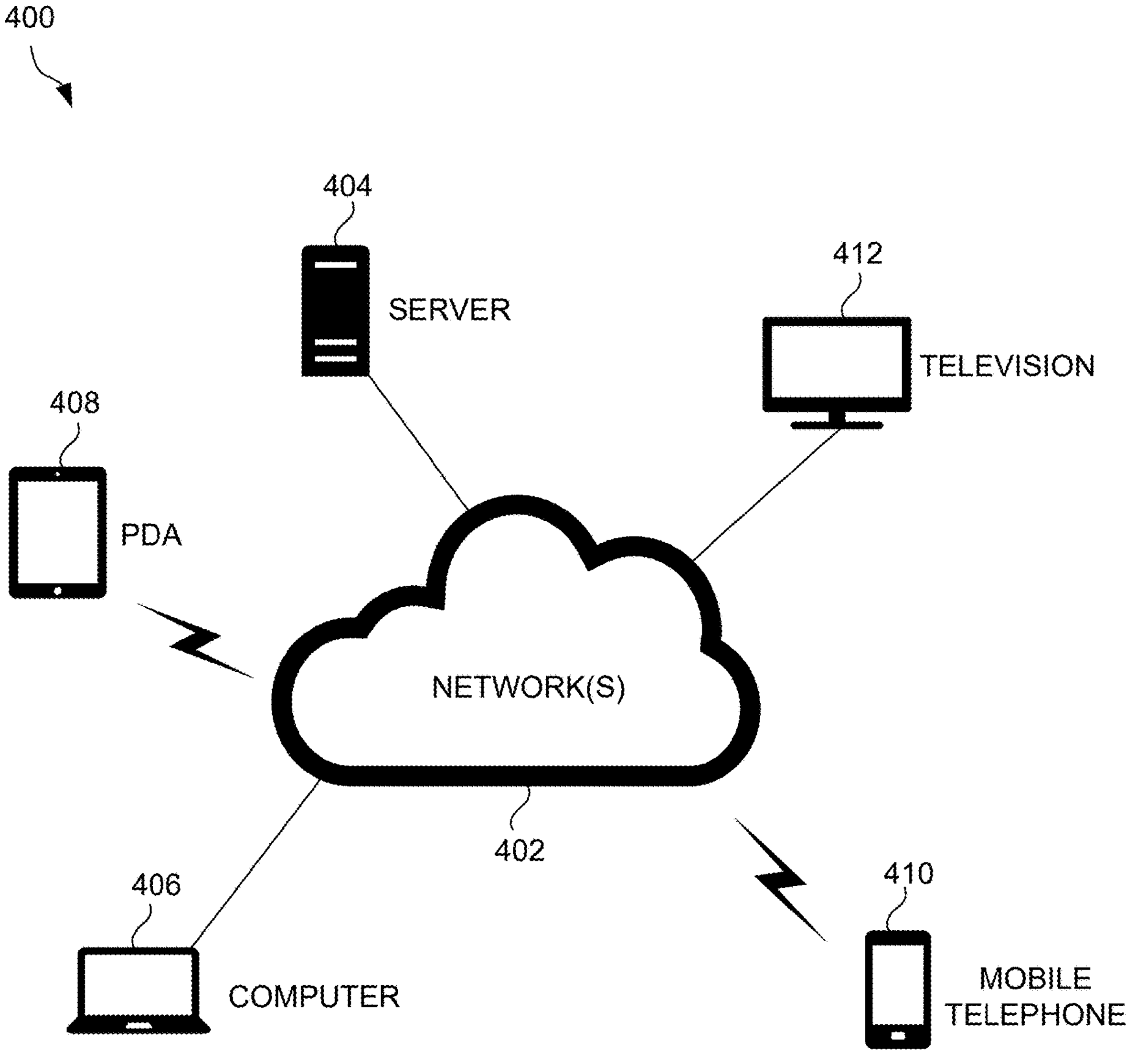
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
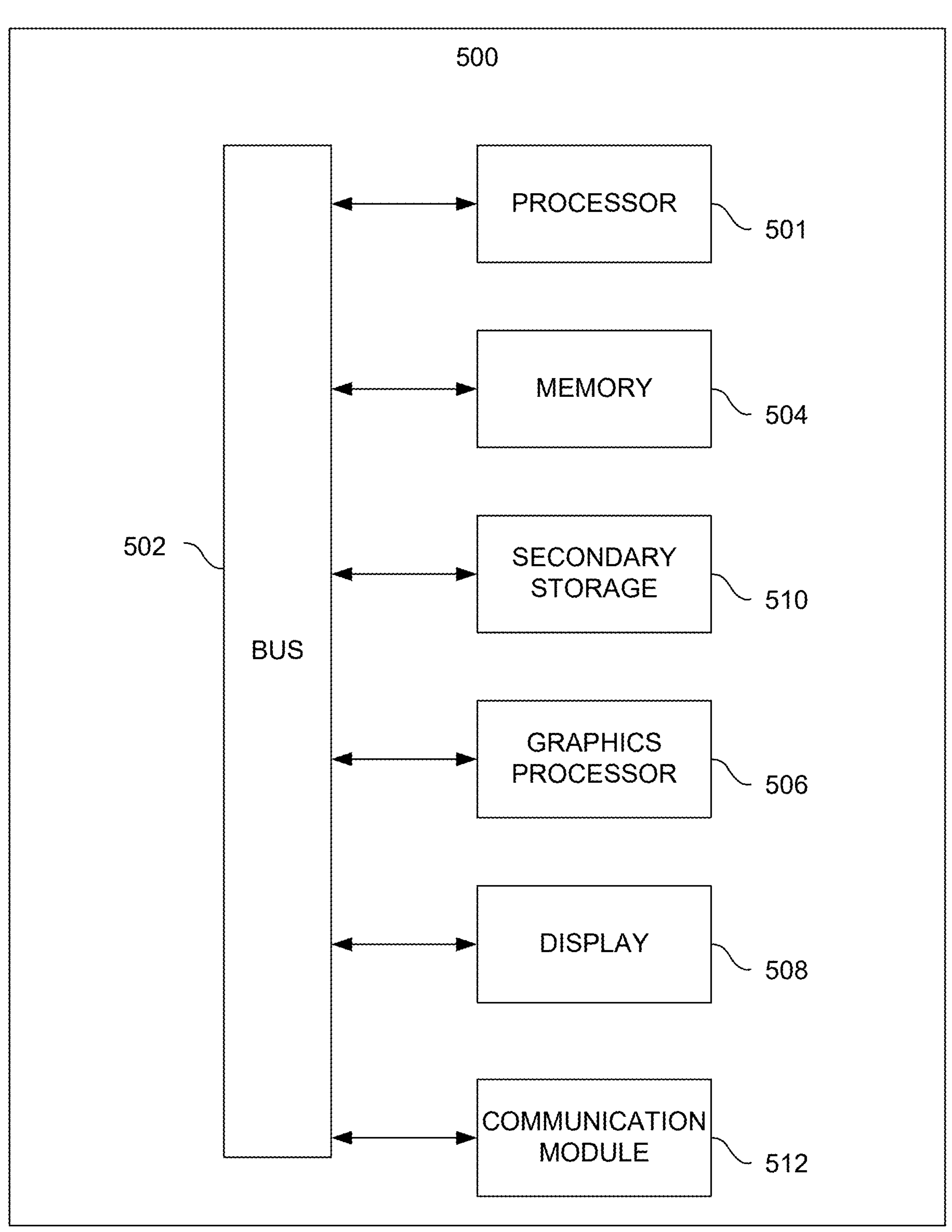
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a “computer-readable medium” includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to prevent storage of duplicate data items in a memory to reduce an amount of the memory required to store a dataset, by causing the device to:

maintain a map of key and value pairs for unique data items existing in the dataset stored in the memory, wherein each of the key and value pairs corresponds with one of the unique data items and includes a key and a value that are identical to one another and that are of a same data type as the unique data item for which the key and value pair corresponds;

detect a request to write a new data item to the dataset;

determine that the new data item is a duplicate of one of the unique data items by matching the new data item to one of the key and value pairs included in the map;

instead of storing the new data item in the dataset, store a reference to the one of the key and value pairs included in the map for the one of the unique data items, wherein storing the reference to the one of the key and value pairs included in the map prevents storage of duplicate data items in the memory to reduce an amount of the memory required to store the dataset.

2. The non-transitory computer-readable media of claim 1, wherein the dataset includes a plurality of records in a database.

3. The non-transitory computer-readable media of claim 1, wherein the unique data items include strings.

4. The non-transitory computer-readable media of claim 1, wherein the unique data items include complex objects.

5. The non-transitory computer-readable media of claim 1, wherein for each of the key and value pairs, the key and the value included in the key and value pair have a data value that is the same as a data value of the unique data item.

6. The non-transitory computer-readable media of claim 1, wherein the device is further caused to:

detect a new unique data item to be written to the dataset; and store a new key and value pair for the new unique data item in the map.

7. A method to prevent storage of duplicate data items in a memory to reduce an amount of the memory required to store a dataset, the method comprising:

at a computer system:

maintaining a map of key and value pairs for unique data items existing in the dataset stored in the memory, wherein each of the key and value pairs corresponds with one of the unique data items and includes a key and a value that are identical to one another and that are of a same data type as the unique data item for which the key and value pair corresponds;

detecting a request to write a new data item to the dataset;

determining that the new data item is a duplicate of one of the unique data items by matching the new data item to one of the key and value pairs included in the map;

instead of storing the new data item in the dataset, storing a reference to the one of the key and value pairs included in the map for the one of the unique data items, wherein storing the reference to the one of the key and value pairs included in the map prevents storage of duplicate data items in the memory to reduce an amount of the memory required to store the dataset.

8. The method of claim 7, wherein the dataset includes a plurality of records in a database.

9. The method of claim 7, wherein the unique data items include strings.

10. The method of claim 7, wherein the unique data items include complex objects.

11. The method of claim 7, wherein for each of the key and value pairs, the key and the value included in the key and value pair have a data value that is the same as a data value of the unique data item.

12. The method of claim 7, wherein the method further comprises, as the computer system:

detecting a new unique data item to be written to the dataset; and storing a new key and value pair for the new unique data item in the map.

13. A system, comprising:

a non-transitory memory storing instructions; and one or more processors in communication with the non-transitory memory that execute the instructions to prevent storage of duplicate data items in a memory to reduce an amount of the memory required to store a dataset, by executing the instructions to: maintain a map of key and value pairs for unique data items existing in the dataset stored in the memory, wherein each of the key and value pairs corresponds with one of the unique data items and includes a key and a value that are identical to one another and that are of a same data type as the unique data item for which the key and value pair corresponds;

detect a request to write a new data item to the dataset;

determine that the new data item is a duplicate of one of the unique data items by matching the new data item to one of the key and value pairs included in the map;

instead of storing the new data item in the dataset, store a reference to the one of the key and value pairs included in the map for the one of the unique data items, wherein storing the reference to the one of the key and value pairs included in the map prevents storage of duplicate data items in the memory to reduce an amount of the memory required to store the dataset.

* * * * *